(12) United States Patent
Zhang (10) Patent No.: US 8,343,392 B2
(45) Date of Patent: Jan. 1, 2013

(54) COMPOSITE MATERIAL AND PRODUCTION PROCESS OF DISPERSANT

(75) Inventor: Zuyi Zhang, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 12/439,456

(22) PCT Filed: Aug. 30, 2007

(86) PCT No.: PCT/JP2007/067363
§ 371 (c)(1),
(2), (4) Date: Feb. 27, 2009

(87) PCT Pub. No.: WO2008/026778
PCT Pub. Date: Mar. 6, 2008

(65) Prior Publication Data
US 2009/0267033 A1   Oct. 29, 2009

(30) Foreign Application Priority Data

Aug. 31, 2006   (JP) .................. 2006-236721

(51) Int. Cl.
*F21V 9/04*   (2006.01)
*F21V 9/06*   (2006.01)
*G02B 5/22*   (2006.01)
*G02B 5/26*   (2006.01)
*G21K 1/10*   (2006.01)

(52) U.S. Cl. ........ 252/587; 252/589; 427/221; 523/137; 526/277; 526/329.5

(58) Field of Classification Search ........... 252/587, 252/589; 523/137; 524/444, 504, 505; 427/221; 526/277, 329.5
See application file for complete search history.

(56) References Cited

U.S. PATENT DOCUMENTS 4,617,327 A   10/1986   Podszun
(Continued)

FOREIGN PATENT DOCUMENTS

EP   0495732 A1   7/1992
(Continued)

OTHER PUBLICATIONS

Tadafumi Adschiri, Yukiya Hakuta, Kiwamu Sue and Kunio Arai, Hydrothermal synthesis of metal oxide nanoparticles at supercritical conditions,Journal of Nanoparticle Research 3: 227-235, 2001. © 2001 Kluwer Academic Publishers. Printed in the Netherlands.*

(Continued)

*Primary Examiner* — Bijan Ahvazi
(74) *Attorney, Agent, or Firm* — Canon U.S.A., Inc., IP Division (57) ABSTRACT

A composite material is constituted by fine nano-oxide particles, a dispersant, and a transparent resin material. The dispersant includes a polymer of vinyl monomer having a binding acidic group. When $\phi$ is a dimensionless number defined by an average particle size (nm) of the fine nano-oxide particles divided by nm, the polymer has a degree of polymerization of an integer of 3 or more and $8 \times \phi$ or less with the proviso that the integer is a numerical value obtained by dropping a decimal fraction. The composite material is produced through a step of obtaining a dispersant comprising a polymer by polymerizing a vinyl monomer having a binding acidic group in the presence of polyamine or in an aqueous dilute dispersion, and a step of mixing the dispersant, fine nano-oxide particles, and a transparent resin material.

10 Claims, 1 Drawing Sheet

U.S. PATENT DOCUMENTS

| | | | |
|---|---|---|---|
| 4,994,429 A | 2/1991 | Wieserman et al. | |
| 5,116,676 A * | 5/1992 | Winslow | 428/343 |
| 6,660,793 B1 * | 12/2003 | McIntyre et al. | 524/441 |
| 2003/0100630 A1 | 5/2003 | Yamaguchi et al. | |
| 2004/0258608 A1 * | 12/2004 | Cayton et al. | 423/592.1 |
| 2006/0047085 A1 * | 3/2006 | Trivedi | 525/329.7 |

FOREIGN PATENT DOCUMENTS

| | | |
|---|---|---|
| GB | 1156653 A | 7/1969 |
| JP | 56147837 A | 11/1981 |
| JP | 1306477 A | 11/1989 |
| JP | H1-306477 A | 12/1989 |
| JP | H5-25320 A | 2/1993 |
| JP | 2002-020678 A | 1/2002 |
| JP | 2002-55225 A | 2/2002 |
| JP | 2002-105325 A | 4/2002 |
| JP | 2004-524396 | 8/2004 |
| WO | WO2004/113436 A1 * | 12/2004 |
| WO | WO2008/026774 A1 | 3/2008 |

OTHER PUBLICATIONS

Communication pursuant to Article 94(3) EPC, dated Nov. 3, 2010.

* cited by examiner

COMPOSITE MATERIAL AND PRODUCTION PROCESS OF DISPERSANT

TECHNICAL FIELD

The present invention relates to a composite material comprising a dispersant, fine nano-oxide particles, and a transparent resin material and production processes of the composite material and the dispersant for the fine nano-oxide particles. Particularly, the present invention relates to an optical composite material to which a desired optical characteristic is imparted while suppressing agglomeration of the fine nano-oxide particles and a high-strength composite material suppressed in agglomeration of the fine nano-oxide particles.

BACKGROUND ART

Amorphous thermoplastic resins such as styrene-based resin, acrylic resin and polycarbonate resin and curable resins such as unsaturated polyester resin and diallyl phthalate resin have good transparency to light of wavelengths in the visible region. These resin materials are general-purpose transparent resin materials having low specific gravity and an excellent characteristic well-balanced in terms of mechanical characteristics such as low-temperature moldability, mass-productivity, toughness, flexibility, and shock resistance when compared with inorganic glass materials. However, refractive indices of these transparent resin materials are determined by their constituents, so that the transparent resin materials have a narrow control range of optical characteristics compared with conventional optical glass materials. As one of means for increasing a refractive index of the transparent resin material, an attempt to incorporate, into a resin material, an element having a large atomic number such as bromine or sulfur which is a component contributing to an increase in dielectric constant has been made but there remains a problem that a variable range of the refractive index is still narrow.

In order to remedy such a problem of organic polymeric materials, incorporation of fine particles of inorganic metal oxide, inorganic metal sulfide, or the like into a resin matrix so as to utilize their high refractive indices has been attempted.

For example, Japanese Laid-Open Patent Application (JP-A) Hei 1-306477 has disclosed a hard coating agent, for an optical material, comprising an oxide sol such as an antimony oxide sol and siloxane as a matrix component. In this case, a silane coupling agent or siloxane contributes to dispersion of the colloid. However, in order to apply this coating agent to a bulk material such as a lens, a decrease in particle size of the fine oxide particles in the resin matrix and an improvement in dispersibility of the fine oxide particles remain to be solved as big problems.

In order to improve the dispersibility of the oxide fine particles in the matrix, studies on introduction of a dispersant other than siloxane or a functional group having a dispersing function into the matrix have been made.

JP-A Hei 5-25320 has disclosed a curable composition comprising a thermosetting resin such as acrylic resin or unsaturated polyester resin, an inorganic filler of fine powdery titanium oxide or the like, and a dispersant consisting of a phosphate compound having a terminal aryl group. JP-A 2002-55225 has disclosed an active energy-polymerizable resin layer, as a hard coating surface layer of an optical filter, containing inorganic particles treated with an organic compound having an active energy-curable group and an acidic group such as phosphoric group, sulfonic group or carboxylic group. JP-A (Tokuhyo) 2004-524396 has disclosed a composite composition, as an electric or optic device, comprising inorganic particles and a polymer having a side-chain containing oxysilane group, phosphonate group, sulfide group, amino group, or sulfonate group. JP-A 2002-105325 has disclosed a composition prepared by dispersing ultrafine semiconductor particles in a resin matrix having a polymer chain copolymerized with radical-polymerizable phosphine oxide as a ligand for the fine particles. JP-A 2002-20678 has disclosed a dispersing method of fine metal oxide particles for a coating film, in which an adsorptive segment is imparted to a polymer main chain. In these dispersion methods, interaction between a surface of inorganic fine particle and a functional group such as phosphoric group, phosphine oxide or carboxyl group is ensured but there arises such a problem that a resultant bonding strength is still weak. Therefore, particularly, with respect to particles of a particle size of 10 nm or less, a satisfactory dispersion performance has not yet obtained, so that the use of the resultant dispersoid is limited to a thin coating film. In the case of requiring thermal moldability, it is required that dispersibility of fine nano-oxide particles is not destroyed by flow of a thermoplastic matrix, which makes the surface treating technique of the fine oxide particles further difficult.

The problem of the low dispersibility of the fine nano-oxide particles is also involved, in addition to the transparent optical material, in resin materials required to increase their strength by dispersing fine oxide particles; shielding materials for radiation, ultraviolet rays, visible rays, infrared rays, and the like on the basis of an optical characteristic of fine metal oxide particles; nonlinear materials based on plasmon in fine particles; and the like.

As described above, the dispersing technique for fine oxide particles, particularly those of nanometer size has been required.

DISCLOSURE OF THE INVENTION

In view of the above described problems, a principal object of the present invention is to provide a composite material containing fine nano-oxide particles uniformly dispersed in an organic matrix with a degree of agglomeration among particles being reduced.

Another object of the present invention is to provide a production process of the composite material and a production process of a dispersant for the fine nano-oxide particles.

According to an aspect of the present invention, there is provided a composite material comprising:

fine nano-oxide particles;

a dispersant; and a transparent resin material, wherein the dispersant comprises a polymer of vinyl monomer having a binding acidic group, and wherein when $\phi$ is a dimensionless number defined by an average particle size (nm) of the fine nano-oxide particles divided by nm, the polymer has a degree of polymerization of an integer of 3 or more and $8\times\phi$ or less with the proviso that the integer is a numerical value obtained by dropping a decimal fraction.

The vinyl monomer having the binding acidic group may preferably be a phosphoric group-based acrylic monomer represented by the following formula (1):

(1)

wherein $R_1$ is hydrogen atom or methyl group; $R_2$ is alkyl group, halogen atom, or hydrogen atom; and n is an integer of 1 or more.

According to another aspect of the present invention, there is provided a first production process of a composite material, comprising:

a step of obtaining a dispersant comprising a polymer by polymerizing a vinyl monomer having a binding acidic group in an aqueous dilute dispersion solution; and a step of mixing the dispersant, fine nano-oxide particles, and a transparent resin material.

According to a further aspect of the present invention, there is provided a second a production process of composite material, comprising:

a step of obtaining a dispersant comprising a polymer by polymerizing a vinyl monomer having a binding acidic group in the presence of polyamine; and a step of mixing the dispersant, fine nano-oxide particles, and a transparent resin material.

According to a further aspect of the present invention, there is provided a first production process of a dispersant, for fine nano-oxide particles, comprising a polymer of a vinyl monomer having a binding acidic group; the production process comprising:

a step of polymerizing the vinyl monomer having a binding acidic group in an aqueous dilute dispersion solution. According to a still further aspect of the present invention, there is provided a second production process of a dispersant, for fine nano-oxide particles, comprising a polymer of a vinyl monomer having a binding acidic group; the production process comprising:

a step of polymerizing the vinyl monomer having the binding acidic group in the presence of polyamine.

In the present invention, a polymer obtained from a vinyl monomer having a binding acidic group is used as a dispersant and a degree of polymerization of the polymer is an integer of 3 or more and 8×φ or less where φ represents a dimension less number defined by an average particle size (nm) of fine nano-oxide particles divided by nm with the proviso that the integer is a numerical value obtained by dropping a decimal fraction, so that the dispersant has size (degree of polymerization) suitable for the fine nano-oxide particles to be dispersed. As a result, a binding force with respect to a surface of fine nano-oxide particle is considerably improved to suppress agglomeration among the dispersed fine nano-oxide particles. Thus, it is possible to uniformly disperse the fine nano-oxide particles in the organic polymeric material at a high concentration, so that an optical material having a desired optical characteristic and high transparency can be obtained. Further, it is also possible to prepare a mechanical composite material having a high strength by using the fine nano-oxide particles with a high dispersibility. Further, according to the production process of the dispersant of the present invention, it is possible to efficiently produce a polymer having a degree of polymerization suitable for the fine nano-oxide particles by polymerizing the vinyl monomer having the binding acidic group in the aqueous dilute dispersion solution or in the presence of polyamine.

These and other objects, features and advantages of the present invention will become more apparent upon a consideration of the following description of the preferred embodiments of the present invention taken in conjunction with the accompanying drawings.

BEST MODE FOR CARRYING OUT THE INVENTION

The composite material according to the present invention is characterized in that the composite material contains fine nano-oxide particles, a dispersant, and a transparent resin material; that the dispersant comprises a polymer of vinyl monomer having a binding acidic group, and that when φ is a dimensionless number defined by an average particle size (nm) of the fine nano-oxide particles divided by nm, the polymer has a degree of polymerization of an integer of 3 or more and 8×φ or less with the proviso that the integer is a numerical value obtained by dropping a decimal fraction.

The dispersant is a component for dispersing the fine nano-oxide particles and is the polymer obtained from the vinyl monomer having the binding acidic group. The degree of polymerization of the polymer has a lower limit of 3 and an upper limit of an integer of 8×φ or less (with the proviso that the integer is a numeral value obtained by dropping a decimal fraction). The degree of polymerization of the polymer may preferably be an integer of 3 or more and 6×φ or less. Here, φ represents a dimensionless number defined as (average particle size (nm))/nm, so that the values 8×φ and 6×φ are also dimensionless numbers.

Herein, the fine nano-oxide particles mean oxide particles having an average particle size of 100 nm or less. The average particle size of the fine nano-oxide particles is a crystallite size and can be measured by a light scattering method or a method in which the fine nano-oxide particles are directly observed through a transmission electron microscope (TEM).

The binding acidic group of the vinyl monomer acts on ion and hydroxyl group present at surface of fine nano-oxide particle to provide a binding force between the dispersant and the fine nano-oxide particle surface. The degree of polymerization of the polymer used in the present invention represents a size of the polymer and specifically means a number of vinyl bonds (linkages) polymerized in the polymer.

Figure 1:
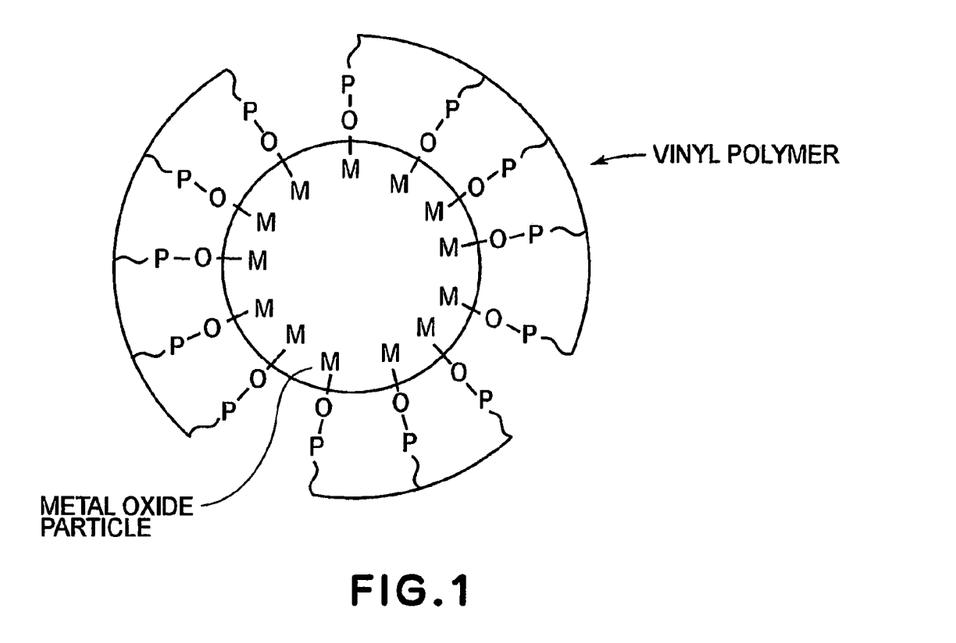
FIG. 1 is a schematic view for illustrating a state in which a fine nano-oxide particle is modified with a dispersant in a composite material according to the present invention.

FIG. 1 schematically illustrates a state in which a fine nano-oxide particle is modified with a dispersant in the composite material according to the present invention. When the degree of polymerization of the vinyl polymer is 3 or more, the number of connecting points per polymer with respect to the fine nano-oxide particle surface is increased, so that a modifying ability with respect to the fine nano-oxide particle surface is enhanced. On the other hand, when the degree of polymerization is the integer of 8×φ or less, the vinyl polymer having the binding acidic group can arrange appropriately at the fine nano-oxide particle surface to efficiently cover the fine nano-oxide particle surface. More specifically, a probability of connection a plurality of fine nano-oxide particles with one polymer molecule is lowered. As a result, the surface of fine nano-oxide particle is completely covered and the fine nano-oxide particles can be independently dispersed, so that it is possible to prevent agglomeration among the fine nano-oxide particles.

When weights of the dispersant and the fine nano-oxide particles are taken as A and B, respectively, a weight ratio (A/B) may be adjusted depending on the average particle size but may preferably be 1/99 to 80/20. The content of the fine nano-oxide particles in the composite material may be arbitrarily set depending on the use of the composite material but when a weight of the transparent resin material is taken as C, a weight ratio (B/C) is ordinarily 0.5/99.5 to 80/20.

The composite material may further contain a component (D), other than the dispersant (A), the fine nano-oxide particles (B), and the transparent resin material (C). The content of the component (D) may preferably be 5 wt. % or less per the composite material. The component D, may be a byproduct of the dispersant, a unreacted monomer or the like.

The dispersant in the present invention comprises a polymer of the vinyl monomer having the binding acidic group. In the present invention, the binding acidic group of the vinyl monomer is not particularly limited so long as the binding acidic group is a functional group capable of binding to metal ion of a metal oxide. Examples of the binding acidic group may include carboxyl group, sulfonic group, phosphoric group, and thiol group. It is also possible to use an organic group having β-diketone structure as the binding acidic group.

The vinyl polymer having the binding acidic group used in the present invention is prepared by polymerizing a vinyl monomer having the binding acidic group, a vinyl monomer mixture containing the vinyl monomer, or a polymerizable oligomer of the vinyl monomer.

Examples of the binding acidic group containing vinyl monomer may include sulfonic group-containing vinyl monomers such as $CH_2=CHSO_3H$, $CH_2=CHCH_2SO_3H$, $H_2C=C(CH_3)COOC_3H_4OSO_3H$, $H_2C=C(CH_3)COOC_3H_6SO_3H$, $H_2C=C(CH_3)COOC_2H_4OCOC_5H_{10}OSO_3H$, $H_2C=CHCOOC_2H_4OCOC_5H_{100}SO_3H$, and $H_2C=CHCOOC_{12}H_{24}(1,4\text{-ph})SO_3H$.

Examples of the carboxyl group-containing vinyl monomer may include compounds represented by the following formulas (2) and (3):

(2)

(3)

wherein $R_5$ and $R_6$ independently represent hydrogen atom or methyl group.

Examples of the phosphoric group-containing vinyl monomer may include (meth)acrylate monomer having phosphoric group represented by the following formulas (4) and (5):

(4)

(5)

wherein $R_7$, $R_9$ and $R_{12}$ independently represent hydrogen atom or methyl group; $R_8$, $R_{10}$ and $R_{11}$ independently represent hydrogen atom or alkyl group; and n, m and l are an integer of 1 or more.

Commercially available phosphoric group-containing vinyl monomer may include compounds represented by the following formulas (4-1) to (4-6):

(4-1)

(4-2)

(4-3)

(4-4)

p = 4, 5

(4-5)

q = 5, 6

(4-6)

r = 5, 6

Examples of the thiol group-containing vinyl monomer may include $CH_2=CHCH_2SH$ and $CH_2=CHCH_2CH_2SH$.

It is also possible to add another vinyl monomer as a copolymerization component with the binding acidic group-containing vinyl monomer so long as a binding force with respect to the oxide particle is not impaired.

Examples of such a vinyl monomer may include acrylates, methacrylates, acrylonitrile, methacrylonitrile, styrene, nuclear-substituted styrenes, alkyl vinyl ethers, alkyl vinyl esters, perfluoroalkyl vinyl ethers, perfluoroalkyl vinyl esters, maleic acid, maleic anhydride, fumaric acid, itaconic acid, maleimide, and phenylmaleimide.

As the dispersant in the present invention, it is also possible to use a compound in which the above described binding acidic group is imparted to a vinyl polymer having a reactive functional group. For example, the vinyl polymer having the reactive functional group such as epoxy group or hydroxyl group is reacted with $P_2O_5$ or $H_3PO_4$, whereby the vinyl polymer can be phosphorylated.

The vinyl polymer having the binding acidic group may preferably contain the acrylic monomer component in an amount of 20 wt. % or more, particularly 50 wt. % or more as a monomer component therein. This is because when the amount of the acrylic monomer component is increased, an affinity for a general purpose transparent resin material is increased, thus leading to good transparency of fine nano-oxide particle-dispersed composite material.

The above described binding acidic group may preferably be carboxyl group, sulfonic group, or phosphoric group, particularly phosphoric group. These binding acidic groups form strong ionic bond with metal ion of the oxide, so that the vinyl polymer is firmly held at the fine nano-oxide particle surface. In the case of the phosphoric group, it forms P—O-M bond (M: metal ion of the oxide) with the metal ion located at the oxide particle surface and remains attached on the oxide particle surface in many environments including moisture environment. Further, from the viewpoints of economy and an affinity for the matrix, it is more preferable that the phosphoric group-containing acrylates represented by the above described formulas (4-1) to (4-6) are used.

A production process of the fine nano-oxide particles constituting the composite material of the present invention is not particularly limited but from the viewpoint of uniformity of particle, fine nano-oxide particles produced through flame method, hydrothermal method, sol-gel method, or the like are used. Particularly, the fine nano-oxide particles may preferably be used in a uniform dispersion state in a dispersion medium. Oxide colloid synthesized through the hydrothermal method (synthesis) may more preferably be used. As the fine oxide particles obtained by the hydrothermal method, a colloid sol is prepared by a process in which hydroxide is formed by a known method such as ion exchanging method, deflocculating method or hydrolysis method, and then heated to transform into a colloid.

Examples of the ion exchanging method may include a method in which acidic salt of metal is treated with hydrogen-type cation exchange resin and a method in which basic salt of metal is treated with hydrogen-type anion exchange resin.

Examples of the deflocculating method may include a method in which a gel obtained by neutralizing the acidic salt of metal with base or the basic salt of metal with acid is washed and then is deflocculated with an acid or a base.

Examples of the hydrolysis method may include a method in which alkoxide of metal is hydrolyzed and a method in which unnecessary acid is removed after the basic salt of metal is hydrolyzed under heating.

The fine oxide particles may preferably be surface-treated with acid, base, an organic compound, a surfactant, or the like during or after the hydrothermal synthesis, thus exhibiting dispersibility. The oxide particles may also be directly surface-treated with the binding acidic group-containing vinyl polymer.

The fine nano-oxide particles in the present invention are finally covered with the vinyl polymer having the binding acidic group, irrespective of pre-treatment for the fine nano-oxide particles.

The fine nano-oxide particles may preferably have an average particle size in a range of 0.5-30 nm, more preferably 1-10 nm. When the particle size is 0.5 nm or larger, a characteristic of the oxide can be exhibited. When the particle size is 30 nm or smaller, original light scattering by the particles is less, so that it is possible to obtain a high-transparency composite material when the fine nano-oxide particles are combined with the resin matrix. For use in a material, having an extremely low degree of scattering, such as a lens, fine nano-oxide particles having an average particle size of 10 nm or less, preferably 8 nm or less, are used.

In the present invention, any fine nano-oxide particles except for fine nano-oxide particles of alkali metal can be used. Examples of oxides for the nano-oxide particles of the present invention may include magnesium oxide, aluminum oxide, iron oxide, titanium oxide, gallium oxide, niobium oxide, tin oxide, indium oxide, zirconium oxide, lanthanum oxide, cadmium oxide, hafnium oxide, erbium oxide, neodymium oxide, cerium oxide, dysprosium oxide, and a mixed oxide of these oxides. From the viewpoint of stability, it is preferable that aluminum oxide, iron oxide, titanium oxide, galium oxide, niobium oxide, tin oxide, indium oxide, zirconium oxide, lanthanum oxide, cadmium oxide, hafnium oxide, erbium oxide, neodymium oxide, cerium oxide, dysprosium oxide, and a mixed oxide of these oxides are used. Such fine oxide particles of nano-size ordinarily have many hydroxyl groups at their surfaces and are stabilized in many cases by electric double layer created by acid or base or by a surface treatment agent. Further, the fine oxide particles used in the present invention may also be a hydroxylated particles such as oxide particles containing hydroxyl group in their particle lattices.

The transparent resin material contained in the composite material of the present invention is not particularly limited so long as it is transparent but may be a thermoplastic resin material or a thermosetting resin material. Examples of the thermoplastic resin material may suitably include styrene-based resin, acrylic resin, aromatic polycarbonate resin, and amorphous polyolefin resin. Examples of the thermosetting resin material may include polyurethane, polythiourethane, and polysiloxane.

The transparent resin material, the dispersant, and the fine nano-oxide can be directly mixed (kneaded) to prepare the composite material, Further, it is also possible to incorporate the fine nano-oxide particles into the transparent resin material component after the fine nano-oxide particles are treated with the dispersant. More specifically, depending on a characteristic of the resin material, with respect to a resin material soluble in the organic solvent, a solution of the resin material dissolved in a solvent in advance and a dispersion solution of the fine nano-oxide particles dispersed by the dispersant are mixed to prepare a uniform dispersion solution. Thereafter, the solvent is removed from the dispersion solution to obtain a resin material in which the fine nano-oxide particles excellent in dispersibility are dispersed. Further, it is also possible to employ a method in which a resin material is dissolved in the dispersion solution of the fine nano-oxide particles dispersed in a solvent and thereafter the solvent is removed. Further, it is also possible to obtain a resin material, in which the fine nano-oxide particles are dispersed, by introducing the dispersed fine nano-oxide particles into a monomer for forming the resin material and then polymerizing the monomer. As necessary, it is also possible to carry out the polymerization by using the resin material-forming monomer and an oligomer having a polymerizable functional group or two or more species of polymerizable oligomers as starting materials for the resin material. In the case of forming a composite material of the fine nano-oxide particles with the thermoplastic resin material, the dispersible fine nano-oxide particles have high dispersibility and interaction of the nano-oxide particles with the resin matrix is minimized, so that it is possible to apply a conventional molding method utilizing thermoplasticity. The resultant composite material shows a high transparency, since the surface treatment layer is not detached from the oxide particle during molding to keep the dispersibility of the particles. As the thermoplastic resin material, acrylic resin and aromatic polycarbonate resin are particularly preferred.

The composite material of the present invention can be used for a transparent optical material, an optical filter, and a structural material with high mechanical strength. In the case of the structural material, transparency is not necessarily required so long as particle dispersibility dominating mechanical properties can be realized, so that the composite material may contain fine oxide particles having an average particle size of 30 nm or more. The composite material of the present invention can be suitably used as an optical coating film for a glass base material or a lens bulk material. By selecting the kind and the content of the fine nano-oxide particles, it is possible to design a refractive index and a wavelength dispersion characteristic which are required for lens design. For example, when a high refractive index is required, nano-particles of materials such as titanium oxide, tin oxide, and niobium oxide may be used appropriately. As a low dispersion material, fine nano-oxide particles such as those of aluminum oxide, silica and the like may be used.

Figure 2:
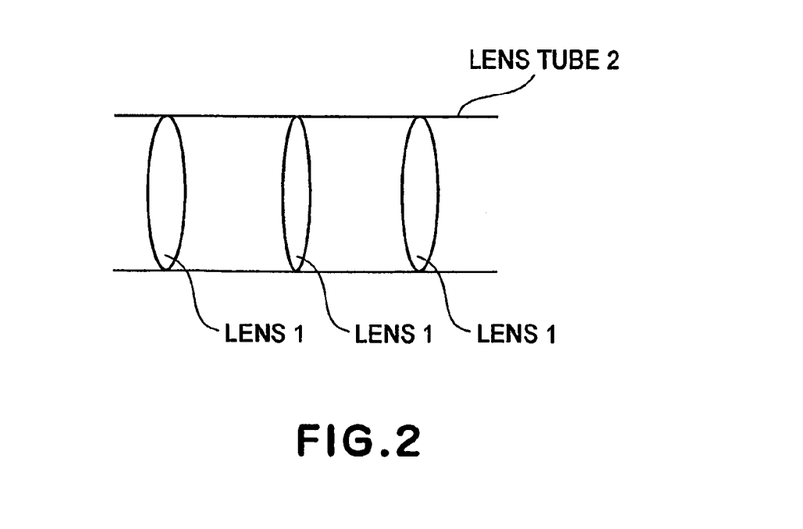
FIG. 2 is a schematic view for illustrating a lens molded from the composite material of the present invention.

FIG. 2 schematically illustrate a lens prepared by molding the composite material of the present invention. The composite material of the present invention is excellent in dispersibility of the fine nano-oxide particles contained in the composite material, so that it is possible to obtain a lens which is transparent and has a high refractive index. Referring to FIG. 2, a reference numeral 1 represents a plurality of lenses obtained by molding the composite material of the present invention, and a reference numeral 2 represents a lens tube for supporting the plurality of lenses 1.

Next, a production process of the dispersant according to the present invention will be described. The dispersant production process of the present invention is classified into a method in which polymerization is performed in an aqueous dilute dispersion solution and a method in which polymerization is performed by using polyamine as a template (mold or reference substance). Herein, the aqueous dilute dispersion solution means a dispersion solution in which a concentration of the vinyl monomer having the binding acidic group is 10 wt. % or less, preferably 8 wt. % or less.

In the case of performing the polymerization in the aqueous dilute solution, the vinyl monomer having the binding acidic group has a tendency that a hydrophobic portion containing vinyl bond causes association to form a micelle. When the vinyl monomer is polymerized in a micelle state, it is possible to obtain a degree of polymerization corresponding to a micelle size. At a critical micelle concentration or less, a resultant associate becomes small, so that a polymer with a low degree of polymerization is obtained. The micelle size can be controlled by using a thermodynamic method, a chemical method, etc. In the thermodynamic method, the degree of polymerization of the vinyl polymer is controlled by appropriately setting a concentration of the vinyl monomer having the binding acidic group, a polymerization temperature, introduction of an aqueous solvent such as alcohol, and the like. In the chemical method, a size of the associate can be changed by, e.g., appropriately setting an organic portion of the vinyl monomer having the binding acidic group. Further, by modifying the binding acidic group into a neutral structure, it is also possible to reduce the degree of polymerization of the polymer. By employing the above described methods, it is possible to produce polymers having degree of polymerizations up to 200 and the dispersant in the present invention can be suitably used therefor. Further, by controlling the size of the associate through light scattering method as desired, it is possible to obtain a more precise dispersant.

In the case of using polyamine as a template agent to perform polymerization, it is possible to use any polyamine compound so long as it form a neutral compound, with the binding acidic group-containing vinyl monomer, soluble in an organic solvent, water, or a mixture solvent. Examples of the polyamine compounds may include linear or branched polyamines represented by formulas I-(1) to I-(7) shown below, cyclic amines represented by formulas II-(1) and II-(2) shown below, heteroaromatic amines represented by formulas III-(1) to III-(3) shown below, and aniline amines represented by formulas IV-(1) and IV-(2) shown below.

The binding acidic group-containing vinyl monomer and polyamine form an associate in the dispersion solution by acid-base bonding between the binding acidic group of the vinyl monomer and polyamine. By performing polymerization in an associate state, it is possible to obtain a vinyl polymer having a desired size. The associate state varies depending on a ratio between polyamine and the binding acidic group-containing vinyl monomer and a concentration of the binding acidic group-containing vinyl monomer in the solution. However, generally, a molar ratio between the binding acidic group-containing vinyl monomer and polyamine in the solution is set to be 20 or less and the concentration of the binding acidic group-containing vinyl monomer in the solution is 10 wt. % or less. Under these conditions, the polymerization is performed. As a result, it is to easily obtain a polymer having a degree of polymerization of a value which is ten times or less the number of nitrogen atoms in polyamine. Such a polymer can be suitably used as the dispersant in the present invention. After the polymerization is performed, polyamine-removing treatment may also be made. Further, polyamine can also be removed after the fine nano-oxide particles are dispersed and treated by a mixture of the binding acidic group-containing vinyl polymer and polyamine. As a method of removing polyamine, it is possible to use a method in which polyamine is removed by strong acid or cation exchange resin and a method in which cleaning or neutralization with dialysis membrane is performed.

The polymerization reaction is performed by adding a polymerization initiator to the polymerization system. Examples of the polymerization initiator may include azo-type initiators such as 2,2-azobisisobutyronitrile, 2,2-azobis (2,4-dimethylvaleronitrile), dimethyl 2,2-azobis(2-methyl-propionate), and dimethyl 2,2-azobisisobutylate; and peroxide-type initiators such as lauryl peroxide, benzoyl peroxide, and tert-butyl peroctoate.

Further, it is also possible to initiate radical copolymerization only by light irradiation. As a photodegradable radical initiator, it is possible to use, e.g., aminoacetophenones such as α-aminoacetophenone and 2-benzyl-2-dimethylamino-1-(4-morphorinophenyl)-butane-1; benzyldimethylketals; and glyoxylates.

In the dispersant production process of the present invention, the vinyl monomer having the binding acidic group may preferably be an acrylic monomer. When an amount of the acrylic monomer component in the dispersant is increased, an affinity for a general-purpose resin material is increased, thus leading to transparency of the composite material in which the fine nano-oxide particles are dispersed.

The binding acidic group of the vinyl monomer may preferably be carboxyl group, sulfonic group, or phosphoric group. These functional groups contribute to control of the degree of polymerization of the polymer during the polymerization and the resultant polymer strongly binds to the surface of the fine nano-oxide particle to exhibit a high dispersion effect. The binding acidic group may particularly preferably be phosphoric group. The phosphoric group forms P—O-M bond or linkage (M: metal ion of oxide) with an associated metal ion at the surface of oxide particle and remains attached on the fine oxide particles in many environments including a moisture environment, as a result, the dispersant is firmly adsorbed by the oxide particle surface. Further, from the viewpoints of a economy and affinity for the matrix, the binding acidic group may more preferably be the phosphoric group-containing acrylates represented by the above described formulas (4-1) to (4-6).

By employing the above described production process, it is possible to efficiently produce a dispersant having a degree of polymerization suitable for dispersion of the fine nano-oxide particles.

The composite material of the present invention contains the dispersant and the fine nano-oxide particles and agglomeration among the fine nano-oxide particles is suppressed, so that the composite material can be utilized as an optical composite material to which a desired optical characteristic is imparted and as a high-strength composite material.

Hereinbelow, the present invention will be described more specifically based on Examples. In the following Examples, "%" represents "wt. % (% by weight)".

EXAMPLE 1

By dissolving sodium phosphate represented by formula (12) shown below in ion exchange water, a 1%-aqueous solution was obtained.

(12)

To the aqueous solution, potassium persulfate (polymerization initiator) was added so as to provide a concentration of 0.02% and dissolved in the aqueous solution under stirring.

Thereafter, the resultant aqueous solution was heated for 24 hours at 50° C. to perform polymerization. The resultant aqueous solution is ion-exchanged by cationic ion-exchange resin to obtain a vinyl polymer having phosphoric group. When the aqueous solution was subjected to measurement by light scattering method, it was confirmed that the polymer in the aqueous solution was in the form of particles of about 1 nm to 2 nm. Further, by using 2,5-hydroxybenzoic acid as a matrix, the aqueous solution was subjected to measurement by time-of-flight mass spectrometer (TOF-MS). It was confirmed that a peak showing a mass-to-charge ratio (m/z) of 1000 to 4500 and thus the aqueous solution contained a polymer having a degree of polymerization of 5 to 20. The aqueous solution was concentrated to obtain a viscous liquid having a solid content of about 20% (dispersant 1).

10 g of ITO (indium-tin-oxide) powder (average particle size: 4.2 nm), 1 g of dispersant 1, and 100 g of 5%-dispersion solution of polymethylmethacrylate (PMMA) in methyl ethyl ketone (MEK) were mixed and pulverized for 30 hours in a paint shaker with zirconia beads having a diameter of 1 mm. The resultant paste was deaerated by centrifugal force to obtain a coating paste. A glass lens was coated with the coating paste and heated at 100° C. to solidify the film, thus preparing a transparent film-coated glass lens. The coated film had a thickness of about 120 nm and a refractive index of 1.56.

EXAMPLE 2

By dissolving sodium phosphate (1) represented by formula (12) shown below and methacrylic acid (B) in ion exchange water, an aqueous solution containing (A) at a concentration of 0.8% and (B) at a concentration of 0.2% was obtained.

(12)

To the aqueous solution, potassium persulfate (polymerization initiator) was added so as to provide a concentration of 0.02% and dissolved in the aqueous solution under stirring.

Thereafter, the resultant aqueous solution was heated for 24 hours at 50° C. to perform polymerization. The resultant aqueous solution is ion-exchanged by cationic ion-exchange resin to obtain a vinyl polymer having phosphoric group and carboxyl group. Further, by using 2,5-hydroxybenzoic acid as a matrix, the aqueous solution was subjected to measurement by TOF-MS. It was confirmed that a peak showing a m/z ratio of 1000 to 6500 and thus the aqueous solution contained a polymer having a degree of polymerization of 5 to 30. The aqueous solution was concentrated to obtain a viscous liquid having a solid content of about 20% (dispersant 2).

20 g of TiO$_2$ powder (average particle size: 8.1 nm), 4 g of dispersant 2, and 50 g of MEK were mixed and pulverized for 30 hours in a paint shaker with zirconia beads having a diameter of 1 mm. Thereafter, the mixture was mixed with 200 g of 5% dispersion solution of PMMA in MEK. The resultant paste was deaerated by centrifugal force to obtain a coating paste. A fluorine-coated glass lens was coated with the coating paste and heated at 100° C. to solidify the film. The film was removed from the glass lens to obtain a composite film containing a transparent titanium oxide component. When a refractive index of the composite film was measured, the refractive index was 1.91.

EXAMPLE 3

A phosphate represented by formula (13) shown below was dissolved in a 70%-propanol aqueous solution and to the aqueous solution, a polyamine represented by formula (14) shown below was added, thus preparing a solution containing the phosphate at a concentration of 2% and the polyamine at a concentration of 0.25%.

(13)

(14)

To the solution, 2,2-azobisisobutyronitrile (polymerization initiator) was added so as to provide a concentration of 0.02% and dissolved in the aqueous solution under stirring.

Thereafter, the resultant aqueous solution was heated for 24 hours at 60° C. to perform polymerization. The resultant aqueous solution is ion-exchanged by cationic ion-exchange resin to obtain a vinyl polymer having phosphoric group. When the aqueous solution was subjected to measurement by light scattering method, it was confirmed that the polymer in the aqueous solution was in the form of particles of about 1 nm to 2 nm. Further, by using 2,5-hydroxybenzoic acid as a matrix, the aqueous solution was subjected to measurement by TOF-MS. It was confirmed that a peak showing a m/z ratio of 800 to 2200 and thus the aqueous solution contained a polymer having a degree of polymerization of 4 to 10. The aqueous solution was concentrated to obtain a viscous liquid having a solid content of about 20% (dispersant 3).

To 100 g of 10%-$SnO_2$ aqueous sol (average particle size: 2 nm), 3 g of dispersant 3 was added and the solvent was substituted with an about 70%-propanol aqueous solution under heating. Thereafter, the resultant aqueous solution was placed in a dialysis membrane and was externally washed sufficiently with a propanol aqueous solution. Thereafter, under heating, solvent substitution with MEK was performed and then 100 g of 5%-dispersion solution of PMMA in MEK was mixed with the aqueous solution. The resultant $SnO_2$ dispersion solution was placed in a fluorine-coated glass mold and heated for 10 hours at 80° C. to solidify the dispersion solution to obtain a 3 mm-thick bulk material. The bulk material had a refractive index of 1.64.

EXAMPLE 4

A phosphate represented by formula (13) shown below was dissolved in a 70%-ethanol aqueous solution and to the aqueous solution, a polyamine represented by formula (15) shown below was added, thus preparing a solution containing the phosphate at a concentration of 2% and the polyamine at a concentration of 0.25%.

To the solution, 2,2-azobisisobutyronitrile (polymerization initiator) was added so as to provide a concentration of 0.02% and dissolved in the aqueous solution under stirring.

Thereafter, the resultant aqueous solution was heated for 24 hours at 60° C. to perform polymerization. The resultant aqueous solution is ion-exchanged by cationic ion-exchange resin to obtain a vinyl polymer having phosphoric group. When the aqueous solution was subjected to measurement by light scattering method, it was confirmed that the polymer in the aqueous solution was in the form of particles of about 1 nm to 2 nm. Further, by using 2,5-hydroxybenzoic acid as a matrix, the aqueous solution was subjected to measurement by TOF-MS. It was confirmed that a peak showing a m/z ratio of 800 to 2200 and thus the aqueous solution contained a polymer having a degree of polymerization of 4 to 10. The aqueous solution was concentrated to obtain a viscous liquid having a solid content of about 20% (dispersant 4).

To 100 g of 10%-$TiO_2$ aqueous sol (average particle size: 5 nm), 3 g of dispersant 4 was added and the solvent was substituted with an about 70%-propanol aqueous solution under heating. Thereafter, the resultant aqueous solution was placed in a dialysis membrane and was externally washed sufficiently with a propanol aqueous solution. Thereafter, under heating, solvent substitution with MEK was performed and then 100 g of 5%-dispersion solution of PMMA in MEK was mixed with the aqueous solution. The resultant $TiO_2$ dispersion solution was placed in a fluorine-coated glass mold and heated for 10 hours at 80° C. to solidify the dispersion solution to obtain a 2 mm-thick transparent bulk material. The transparent bulk material had a refractive index of 1.81.

COMPARATIVE EXAMPLE 1

100 g of the $TiO_2$ aqueous sol prepared in Example 4 (solid content: 6%, average particle size: 5 nm) and the solvent was substituted with an about 50%-propanol aqueous solution under heating. Thereafter, the resultant aqueous solution was placed in a dialysis membrane and was externally washed sufficiently with a propanol aqueous solution. Thereafter, when solvent substitution with MEK was performed under heating, the resultant sol gradually became white and turbid. Thereafter, 100 g of 5%-dispersion solution of PMMA in MEK was mixed with the sol. The resultant $TiO_2$ dispersion solution was placed in a fluorine-coated glass mold and heated for 10 hours at 80° C. to solidify the dispersion solution. The resultant bulk material became white and turbid.

INDUSTRIAL APPLICABILITY

According to the composite material of the present invention, agglomeration among fine nano-oxide particles is suppressed, so that the composite material is applicable to an optical composite material to which a desired optical characteristic is imparted and applicable to a high-strength composite material.

While the invention has been described with reference to the structures disclosed herein, it is not confined to the details set forth and this application is intended to cover such modifications or changes as may come within the purpose of the improvements or the scope of the following claims.

The invention claimed is:
1. A composite material comprising:
nano-oxide particles obtained by hydrothermal synthesis having an average particle size of 10 nm or less;
a dispersant; and
a transparent resin material,
wherein the dispersant contains a polymer comprising a vinyl monomer in a dispersion solution containing 10 wt. % or less of the vinyl monomer for binding with the nano-oxide particles,
wherein the polymer has a degree of polymerization of an integer of 4-10 with the proviso that the integer is a numerical value obtained by dropping a decimal fraction, and
wherein the vinyl monomer is represented by the following formula (1):

wherein $R_1$ is hydrogen atom or methyl group; $R_2$ is alkyl group, halogen atom, or hydrogen atom; and n is 1.

2. The material according to claim 1, wherein the dispersant and the nano-oxide particles have a weight ratio of 1/99 to 80/20, and the nano-oxide particles and the transparent resin material have a weight ratio of 0.6/99 to 80/20.

3. The material according to claim 1, wherein the nano-oxide particles have an average particle size of 0.5 nm or more and 10 nm or less.

4. The material according to claim 1, wherein the nano-oxide particles are particles of an oxide selected from the group consisting of aluminum oxide, titanium oxide, niobium oxide, tin oxide, indium oxide, zirconium oxide, lanthanum oxide, cadmium oxide, hafnium oxide, erbium oxide, neodymium oxide, cerium oxide, dysprosium oxide, and a mixed oxide of these oxides.

5. A lens comprising:
composite material, according to claim 1, which has been molded.

6. The material according to claim 1, wherein the nano-oxide particles have an average particle size of 1-10 nm.

7. A production process of a composite material, comprising:
a step of obtaining a dispersant comprising a polymer by polymerizing a vinyl monomer in a dispersion solution containing 10 wt. % or less of the vinyl monomer; and
a step of mixing the dispersant, nano-oxide particles obtained by hydrothermal synthesis having an average particle size of 10 nm less, and a transparent resin material,
wherein the polymer has a degree of polymerization of an integer of 4-10 with the proviso that the integer is a numerical value obtained by dropping a decimal fraction, and
wherein the vinyl monomer is represented by the following formula (1):

(1)

wherein $R_1$ is hydrogen atom or methyl group; $R_2$ is alkyl group, halogen atom, or hydrogen atom; and n is 1.

8. A production process of a composite material, comprising:
a step of obtaining a dispersant comprising a polymer by polymerizing a vinyl monomer in a dispersion solution containing 10 wt. % or less of the vinyl monomer in the presence of polyamine; and
a step of mixing the dispersant, nano-oxide particles obtained by hydrothermal synthesis having an average particle size of 10 nm or less, and a transparent resin material,
wherein the polymer has a degree of polymerization of an integer of 4-10 with the proviso that the integer is a numerical value obtained by dropping a decimal fraction, and
wherein the vinyl monomer is represented by the following formula (1):

(1)

wherein $R_1$ is hydrogen atom or methyl group; $R_2$ is alkyl group, halogen atom, or hydrogen atom; and n is 1.

9. A production process of a dispersant, for nano-oxide particles obtained by hydrothermal synthesis having an average particle size of 10 nm or less, the dispersant containing a polymer comprising a vinyl monomer; the production process comprising:
a step of polymerizing the vinyl monomer in a dispersion solution containing 10 wt. % or less of the vinyl monomer,
wherein the polymer has a degree of polymerization of an integer of 4-10 with the proviso that the integer is a numerical value obtained by dropping a decimal fraction, and represented by the following formula (1):

(1)

wherein $R_1$ is hydrogen atom or methyl group; $R_2$ is alkyl group, halogen atom, or hydrogen atom; and n is 1.

10. A production process of a dispersant, for nano-oxide particles obtained by hydrothermal synthesis having an average particle size of 10 nm or less, the dispersant containing a polymer comprising a vinyl monomer; the production process comprising:
a step of polymerizing the vinyl monomer in a dispersion solution containing 10 wt. % or less of the vinyl monomer in the presence of polyamine,
wherein the polymer has a degree of polymerization of an integer of 4-10 with the proviso that the integer is a numerical value obtained by dropping a decimal fraction, and
wherein the vinyl monomer is represented by the following formula (1):

(1)

wherein $R_1$ is hydrogen atom or methyl group; $R_2$ is alkyl group, halogen atom, or hydrogen atom; and n is 1.

* * * * *